United States Patent
Wu et al.

(10) Patent No.: US 9,184,839 B1
(45) Date of Patent: Nov. 10, 2015

(54) METHOD AND APPARATUS FOR COMPENSATING IMPAIRMENTS IN RADIO FREQUENCY CIRCUITRY OF A WIRELESS DEVICE

(75) Inventors: Songping Wu, Cupertino, CA (US);
Daxiao Yu, Cupertino, CA (US);
Yonghua Song, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 106 days.

(21) Appl. No.: 13/566,157

(22) Filed: Aug. 3, 2012

Related U.S. Application Data

(60) Provisional application No. 61/515,224, filed on Aug. 4, 2011.

(51) Int. Cl.
*H04B 10/2507* (2013.01)
*H04B 17/20* (2015.01)

(52) U.S. Cl.
CPC ............ *H04B 10/2507* (2013.01); *H04B 17/20* (2015.01)

(58) Field of Classification Search
CPC ............... H04L 1/248; H04B 17/0015; H04B 17/0062; H04B 17/009; H04B 3/46; H04B 1/0475; H04B 10/2507; H04W 28/04
USPC ........ 455/140, 154.1, 245.1, 151.4, 284, 334, 455/343.2, 115.1, 501, 63.1, 67.13, 67.11, 455/67.14, 295; 375/346, 371; 370/252; 398/25, 198
See application file for complete search history.

(56) References Cited

U.S. PATENT DOCUMENTS

| | | | | |
|---|---|---|---|---|
| 5,864,764 | A * | 1/1999 | Thro et al. | 455/561 |
| 7,016,401 | B1 * | 3/2006 | Smith et al. | 375/222 |
| 7,567,611 | B2 * | 7/2009 | Chien | 375/219 |
| 8,699,620 | B1 * | 4/2014 | Wu | 375/297 |
| 2010/0111221 | A1 * | 5/2010 | Nash et al. | 375/296 |
| 2010/0158046 | A1 * | 6/2010 | Pu | 370/474 |

* cited by examiner

*Primary Examiner* — Lewis West
*Assistant Examiner* — Dong-Chang Shiue

(57) ABSTRACT

The present disclosure describes techniques for identity-based RF circuitry compensation. In some aspects data from a wireless device is received via radio frequency circuitry, the data including an identifier that uniquely identifies the wireless device. Impairments of the radio frequency circuitry are estimated based on the received data and then the estimated impairments are associated with the identifier of the wireless device. In response to subsequently receiving data that includes the identifier, the radio frequency circuitry is compensated using the estimated impairments.

20 Claims, 6 Drawing Sheets

| Device ID (MAC) 212 | CFO kHz 214 | DC Offset mV 216 | I/Q Imbalance dBc 218 |
|---|---|---|---|
| Smart-Phone 104 (A0:24) | 50 | 100 | -30 |
| IP TV 112 (EA:6F) | 130 | 80 | -60 |
| Router 110 (88:A9) | 45 | 50 | -50 |
| Tablet Computer 106 (57:F0) | 72 | 60 | -20 |

METHOD AND APPARATUS FOR COMPENSATING IMPAIRMENTS IN RADIO FREQUENCY CIRCUITRY OF A WIRELESS DEVICE

RELATED APPLICATIONS

This present disclosure claims priority to U.S. Provisional Patent Application Ser. No. 61/515,224 filed Aug. 4, 2011, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless communication networks allow electronic and computing devices to communicate data with other devices or networks via wireless links. Advancements in wireless communication technology have reduced the size, power consumption, and manufacturing costs of these wireless devices. One of these advancements is the migration to complimentary metal-oxide semiconductor (CMOS) based technology for radio frequency (RF) circuits and components. Producing circuits and components with CMOS technology typically offers cost, design, or density advantages over other traditional RF circuitry technologies.

Performance of CMOS-based circuits at RF frequencies, however, may not be optimal for wireless communication. To address these performance issues, impairments of RF circuitry are often estimated when establishing a wireless link with another wireless device. The impairments of the RF circuitry (e.g., RF circuitry based on CMOS technology) can then be compensated based on these estimates to improve communication performance of the wireless link. After compensation of the impairments, the estimated impairments are typically discarded—due to possible changes in characteristics of a wireless link, such estimated impairments may not be applicable to compensate RF circuitry as time progresses.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving data from a wireless device via radio frequency circuitry, the data including an identifier that uniquely identifies the wireless device, estimating impairments of the radio frequency circuitry based on the received data, associating the estimated impairments with the identifier of the wireless device, and in response to subsequently receiving data that includes the identifier, using the estimated impairments to compensate the radio frequency circuitry.

Another method is described for configuring, based on an identity of a wireless device with which a wireless link is to be established, radio frequency circuitry using known impairment information for the wireless link and establishing the wireless link with the wireless device using the radio frequency circuitry as configured without characterizing additional impairment information.

Still another method is described for receiving a signal from a wireless device with which a wireless link is to be established, estimating impairment values for the wireless link associated with radio frequency circuitry based on the received signal, determining a unique identifier of the wireless device based on the received signal, and indexing the impairment values with the unique identifier of the wireless device effective to enable compensation of the radio frequency circuitry for communication via the wireless link based on the unique identifier of the wireless device.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for estimating impairments of radio frequency (RF) circuitry are often limited to activities performed at a physical layer of a receiver. The physical layer, however, often yields estimates of impairments that are only useful to compensate RF circuitry for establishing a single instance of a wireless link. Once the estimated impairments are used to compensate the RF circuitry, the estimated impairments are often discarded. This disclosure describes techniques of compensating RF circuitry based on an identity of a wireless device with which a wireless link is to be established. Known impairment information associated with an identity of the wireless device can be used to compensate RF circuitry (e.g., RF circuitry based on CMOS technology). By so doing, a wireless link can be established without estimating impairment information, which saves the time or power associated with estimating impairment information each time an attempt is made to establish a wireless link.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
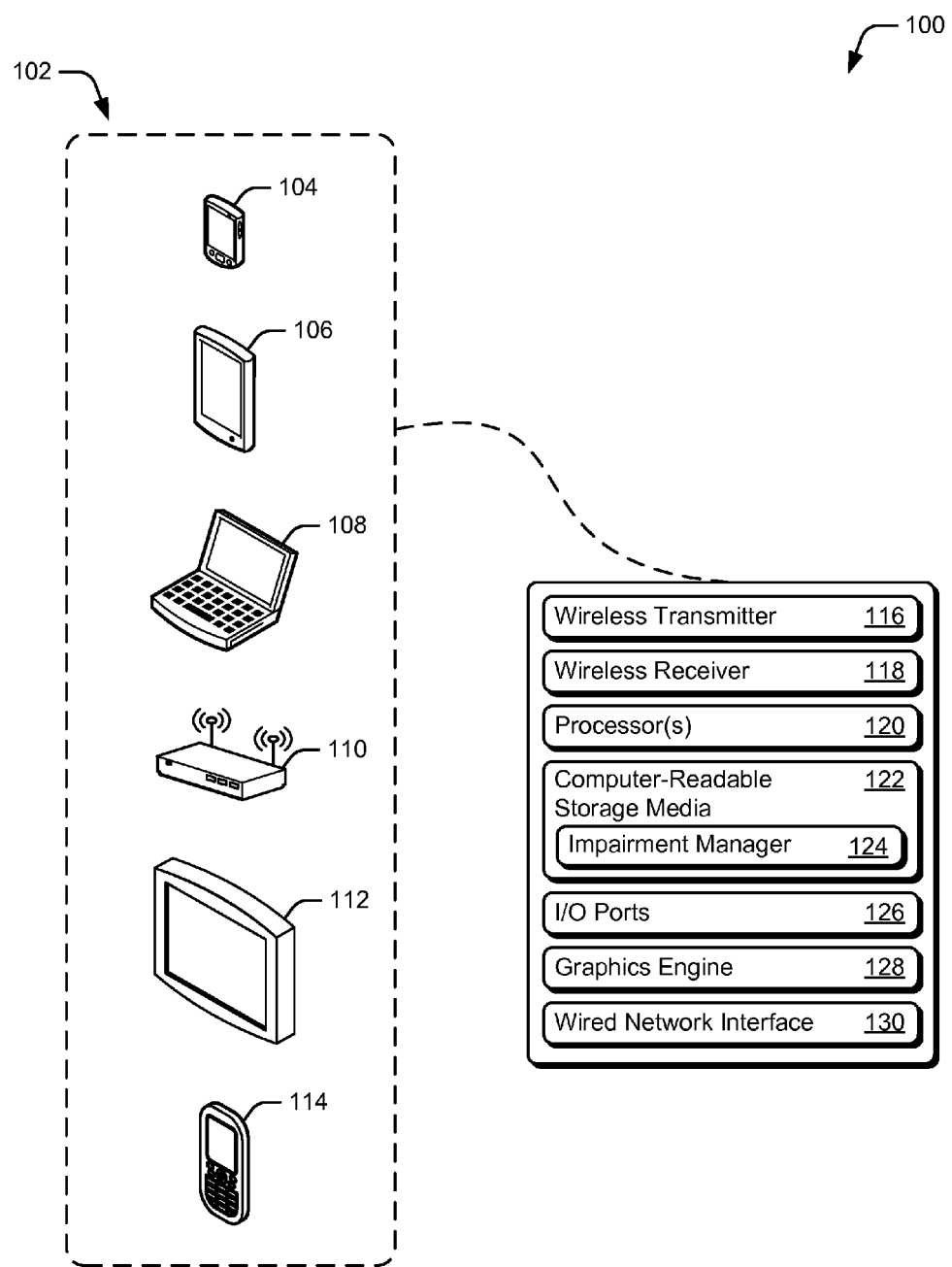
FIG. 1 illustrates an operating environment having wireless devices in accordance with one or more aspects.

FIG. 1 illustrates an example operating environment 100 having wireless devices 102, each of which are capable of communicating data, packets, and/or frames over a wireless network, such as a cellular network, wireless-local-area network (WLAN), or short-range wireless network. Wireless devices 102 include smart-phone 104, tablet computer 106, laptop computer 108, access point 110, internet-protocol enabled television 112 (IP TV 112), and remote control 114. Although not shown, other configurations of wireless devices 102 are also contemplated such as a desktop computer, server, mobile-internet device (MID), mobile gaming console, electronic readers or books (e-readers or e-books), and so on.

Each wireless device 102 includes a wireless transmitter 116 and a wireless receiver 118 for providing a wireless interface to handle various communication protocols, such as for example IEEE 802.11, IEEE 802.16, IEEE 802.16, $3^{rd}$ Generation Partnership Project (3GPP) Long Term Evolution (LTE), Global Positioning System (GPS), and the like. For instance, wireless device 102 can communicate via a WLAN when implementing any of the IEEE 802.11 based protocols (e.g., IEEE 802.11n or IEEE802.11s). Transmitter 116 and receiver 118 may be separate (shown) or combined (not shown) and may be hardware combined with or separate from firmware or software. Transmitter 116 and receiver 118 each include RF circuitry (e.g., RF circuits and/or RF components) configured to perform respective functionalities of each entity. The RF circuitry may be based on any suitable type of semiconductor technology, such as complimentary metal-oxide semiconductor (CMOS) technology.

In some cases, wireless device 102 may support multiple instances of wireless transmitter 116 and/or wireless receiver 118, which enables concurrent communication via multiple networks or technologies. For example, wireless device 102 can concurrently communicate voice data via a cellular network and receive positioning data from satellites associated with GPS service. In other cases a single instance of transmitter 116 and receiver 118 may concurrently support communication via multiple wireless networks, such as cellular networks, short-range wireless networks, or GPS networks. For example, a single instance of transmitter 116 and receiver 118 may be configured as a wireless transceiver capable of communicating via an LTE cellular network and receiving GPS signals.

Wireless devices 102 also include processor(s) 120, computer-readable storage media 122 (CRM 122), and impairment manager 124, which, in one implementation, is embodied on CRM 122. Processor 120 can be any suitable type of processor, either single-core or multi-core, for executing instructions or code associated with applications, programs, firmware, and/or operating system(s) of the wireless device 102. Processor 120 may be constructed with or fabricated from any suitable material such as silicon, dielectric materials (e.g., high-k), or other semiconductors. CRM 122 may include any suitable memory or storage device such as random-access memory (RAM), static RAM (SRAM), non-volatile RAM (NVRAM), read-only memory (ROM), or Flash memory useful to store data of applications, programs, firmware, and/or an operating system of wireless device 102. How impairment manager 124 is implemented and used varies and is described below.

Wireless devices 102 may also include I/O ports 126, graphics engine 128, and wired network interface 130. I/O ports 126 allow wireless devices 102 to interact with other devices and/or users. I/O ports 126 may include any combination of internal or external ports, such as audio inputs and outputs, USB ports, Serial ATA (SATA) ports, PCI-express based ports or card-slots, and/or other legacy ports. Various peripherals may be operatively coupled with I/O ports 126, such as human-input devices (HIDs), external computer-readable storage media, or other peripherals.

Graphics engine 128 processes and renders graphics for wireless devices 102, including user interface elements of applications, programs, or an operating system, and the like. Wired network interface 130 provides connectivity wired networks, which allows wireless devices 102, or components thereof, to communicate via the wired networks. For example, access point 110 may provide a WLAN using wireless transmitter 116 and wireless receiver 118, and communicate data of the WLAN with the Internet via a backhaul link (not shown) associated with wired network interface 130.

Wireless devices 102 may be configured as client devices in a wireless network having an infrastructure-based topology, such as cellular networks or WLANs. Alternately or additionally, wireless devices 102 may be configured as peer-to-peer devices enabling communication with other wireless devices 102. In some cases, a wireless device 102 may be configured as a receiver device, such as for processing GPS signals, frequency modulated (FM) radio signals, or digital video broadcasting (DVB).

Figure 2:
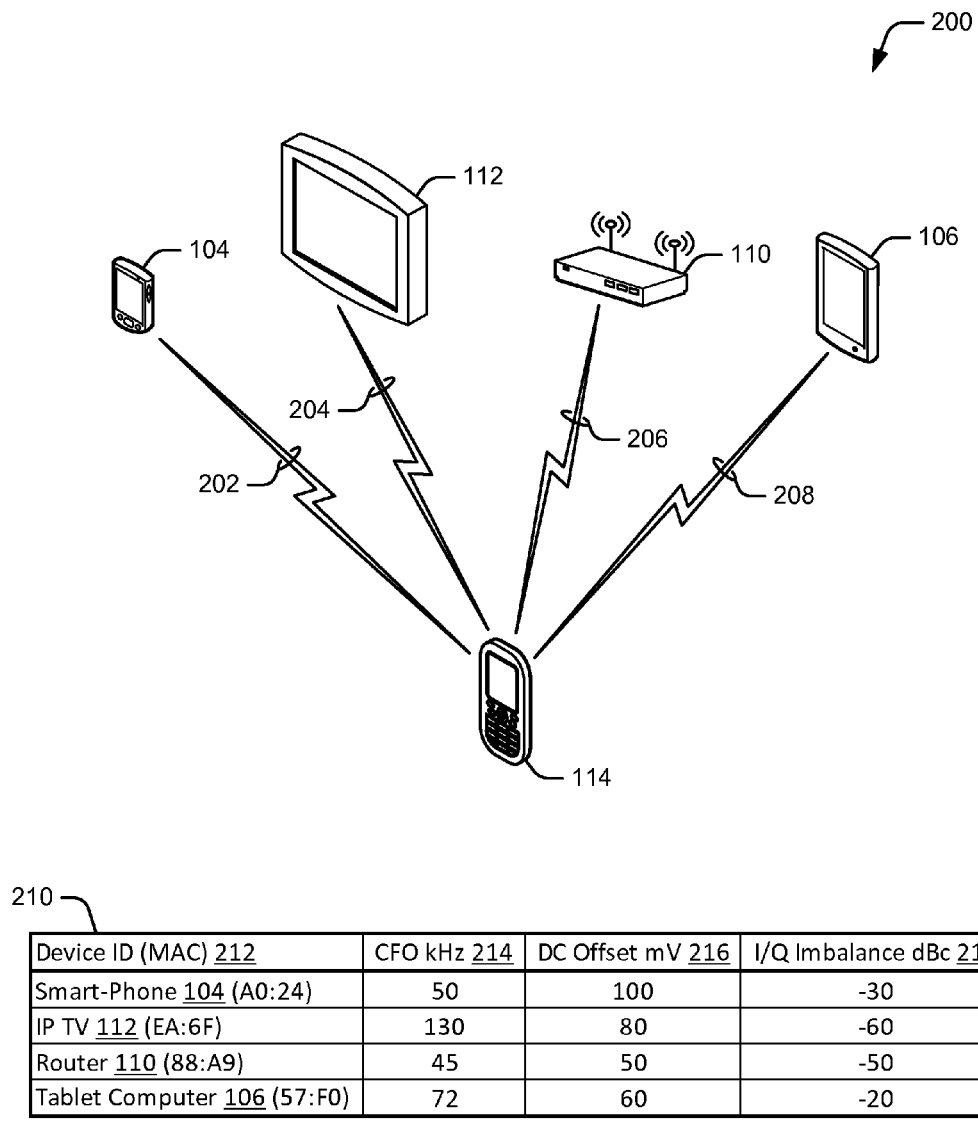
FIG. 2 illustrates an example of devices of FIG. 1 communicating in accordance with one or more aspects.

FIG. 2 illustrates an example of device environment 200 that includes wireless devices 102 communicating in accordance with one or more aspects. By way of example only, remote control 114 is shown communicating with smart-phone 104, IP TV 112, access point 110, and tablet computer 106 via wireless links 202, 204, 206, and 208 respectively. Each wireless device 102 may communicate with any other wireless device 102 or any other suitably configured wireless network or network entity (e.g., cellular base station or wireless sensor network).

Communication between wireless devices 102 may be non-concurrent with another wireless device 102 or concurrent with two or more other wireless devices 102. For example, remote control can download schedule information from access point 110 via wireless link 206 and then subsequently program IP TV 112 via wireless link 204 to record upcoming content based on the schedule information. As another example, smart-phone 104 can concurrently transmit audio and video content via a WLAN (not shown) to IP TV 112 and tablet computer 106 for display or playback.

Each wireless link 202-208 formed by respective wireless devices 102 may have unique communication characteristics, which may depend on one, or both, of the wireless devices 102 communicating. Some of these characteristics may depend on a position, orientation, or proximity of wireless devices 102, such as signal strength, signal quality, signal-to-noise ratios, and the like. Other communication characteristics may be associated with RF circuitry of wireless transmitter 116 or wireless receiver 118 of wireless device 102. These communication characteristics, hereinafter referred to as impairments, are associated with RF circuitry, such as RF transmission chains or RF receive chains at respective ends of each of wireless links 202-208.

Impairments include a variety of characteristics of the RF circuitry associated with each of wireless links 202-208 such as I/Q imbalance, phase noise, carrier frequency offset, Direct Current (DC) voltage offset, local oscillator (LO) leakage, and the like. These impairments can be estimated by a physical layer of a receiver during an attempt to establish a wireless link. RF circuitry of a wireless transmitter 116 or wireless receiver 118 can then be configured to account for these characteristics in order to process data communicated via wireless links 202-208. Data communicated via wireless links 202-208 may be formatted or encapsulated as raw data, data packets, or data frames having internal headers, payloads, or error check coding for example.

Example impairments are shown in impairment index 210, which includes columns for device identifier 212 (device ID 212), carrier frequency offset 214 (CFO 214), DC offset 216, and I/Q imbalance 218, along with corresponding units of measurement. Device ID 212 may be any suitable identifier by which a wireless device may be uniquely identified. For example, device ID 212 may include a medium access control (MAC) address of a wireless interface, a host name, an IP address, serial number, asset control number, and so on. In some cases, device ID 212 may be determined above the physical layer of a receiver, such as at a MAC layer, IP layer, application layer, and so on.

Techniques for Identity-Based RF Circuitry Compensation

The following discussion describes techniques for identity-based RF circuitry compensation. These techniques can be implemented using the previously described environments or entities, such as impairment manager 124 of FIG. 1 embodied on a wireless device 102. These techniques include methods illustrated in FIGS. 3, 4, and 5, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
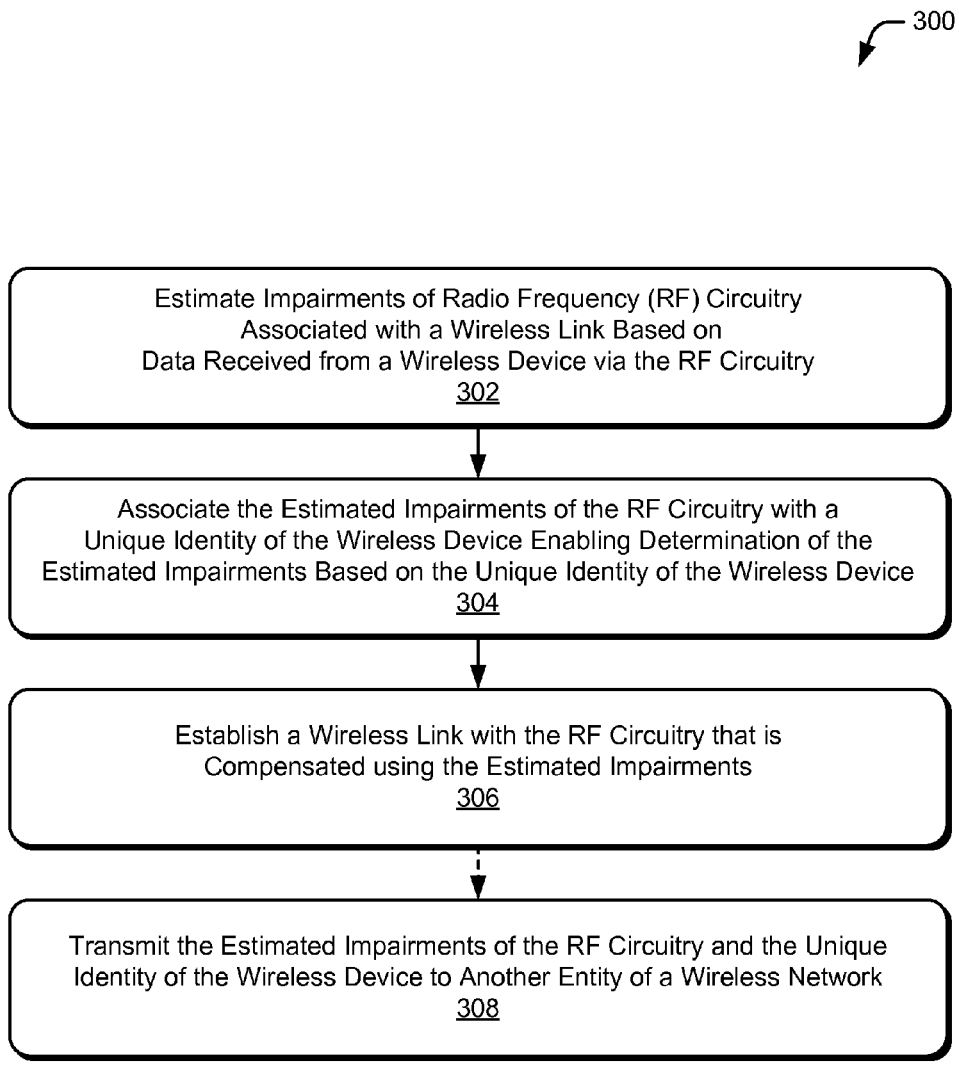
FIG. 3 illustrates a method of associating estimated impairments of RF circuitry with a unique identity of a wireless device.

FIG. 3 depicts a method 300 for associating estimated impairments of RF circuitry with a unique identity of a wireless device, including operations performed by impairment manager 124 of FIG. 1.

At 302, impairments of RF circuitry associated with a wireless link are estimated. These impairments may be estimated based on a signal received from a wireless device via the RF circuitry. The signal may include data or packets received from a wireless device having a unique identity. The data or packets may include an identifier by which the unique identity of the wireless device is determinable. The characteristics of the wireless link may be impairments associated with the RF circuitry. These impairments may include I/Q imbalance, phase noise, carrier frequency offset, DC voltage offset, or local oscillator leakage associated with the RF circuitry. The RF circuitry may be based any suitable circuit technology, such as CMOS technology.

In some cases, the estimation of the characteristics is performed at a physical layer of a receiver or transceiver. For example, impairments of RF circuitry can be determined by physical layer hardware of a receiver during an attempt to establish a wireless link with the other wireless device. Alternately or additionally, impairments for multiple wireless links may be estimated when data or packets are received from multiple wireless devices with which wireless links may be established, respectively.

As an example, consider remote control 114 in the context of FIG. 2, which shows remote control 114 communicating with other wireless devices 102 via wireless links 202-208. Assume that a user of remote control 114 is attempting to initiate display of streaming content on IP TV 112. Here impairment manager 124 of remote control 114 estimates, at a physical layer of receiver 118, impairment values for wireless link 204 based on data packets received from IP TV 112. Impairment manager 124 then populates the appropriate columns of impairment index 210 that correspond to IP TV 112.

At 304, estimated impairments of the RF circuitry are associated with a unique identity of the wireless device. This may be effective to enable a receiving device to determine estimated impairments based on the unique identity of the wireless device. Alternately or additionally, this may be effective to enable compensation of the RF circuitry using the estimated impairments.

The unique identity of the wireless device may be determined at a medium access control (MAC) or software layer of a receiver or transceiver. The unique identity of the wireless device may include a MAC address of a wireless interface, host name, IP address, serial number, asset control number, or other suitable properties associated with the wireless device.

Association of the estimated impairments and the unique identity may be performed at a MAC, software, application, or any suitable layer of a receiver. For example, a unique identity of the wireless device (e.g. MAC address) may be determined at the MAC layer of a receiver and the unique identity may be associated with impairments of the wireless link at the software layer of the receiver. In some cases, actions associated with the software or application layer of the receiver may be offloaded to host device of the receiver.

In the context of the present example, impairment manager 124 of remote control 114 determines, via the MAC layer of receiver 118, a MAC address of IP TV 112. Impairment manager 124 then associates the MAC address of IP TV 112 (last 4 digits shown for brevity) with impairment values stored in impairment index 210. Impairment manager 124 now has an index of impairment values associated with wireless link 204 which is used to communicate with IP TV 112.

At 306, a wireless link with the wireless device is established with the RF circuitry that is compensated using the estimated impairments. The compensation of the RF circuitry may occur during an initial establishment of the wireless link or any subsequent re-establishment of the wireless link. Alternately or additionally, the RF circuitry may be compensated using estimated impairments received from another device within a wireless network.

In some cases, compensating the RF circuitry based on the identity of the wireless device is effective to preclude the need to re-estimate the impairments of the RF circuitry. By so doing, time and processing power typically consumed by re-estimation of the impairments can be conserved each time an attempt is made to establish a wireless link. Thus, repeating operations of method 300 with multiple wireless devices of a wireless communication system may further improve performance of a wireless device.

Continuing the ongoing example, impairment manager 124 compensates RF circuitry of receiver 118 based on the MAC address of IP TV 112. Remote control 114 can then establish wireless link 204 with IP TV 112. The user of remote control 114 is now able to communicate (e.g., send commands) with IP TV 112 via wireless link 204 to initiate display of the streaming content. During subsequent communication with IP TV 112, impairment manager 124 can compensate RF circuitry of receiver 118 using impairment index 210 precluding the need for re-estimating the impairment values for wireless link 204.

Optionally at 308, the estimated impairments of the RF circuitry and the unique identity of the wireless device may be transmitted to another entity of a wireless network. The other entity of the wireless network may be a peer device within the network or a device managing resources for the network. In some cases, performance of the wireless network can be improved based on the estimated impairments of the wireless link and the unique identity of the wireless device. For example, traffic of a mesh or peer-to-peer network can be routed around a peer or node device that has severe impairments.

Concluding the present example, impairment manager 124 transmits impairment values associated with wireless link 204 and the MAC address of IP TV 112 to access point 110. Access point 110 can then leverage this information to improve performance of wireless links between IP TV 112 and other devices (not shown).

Figure 4:
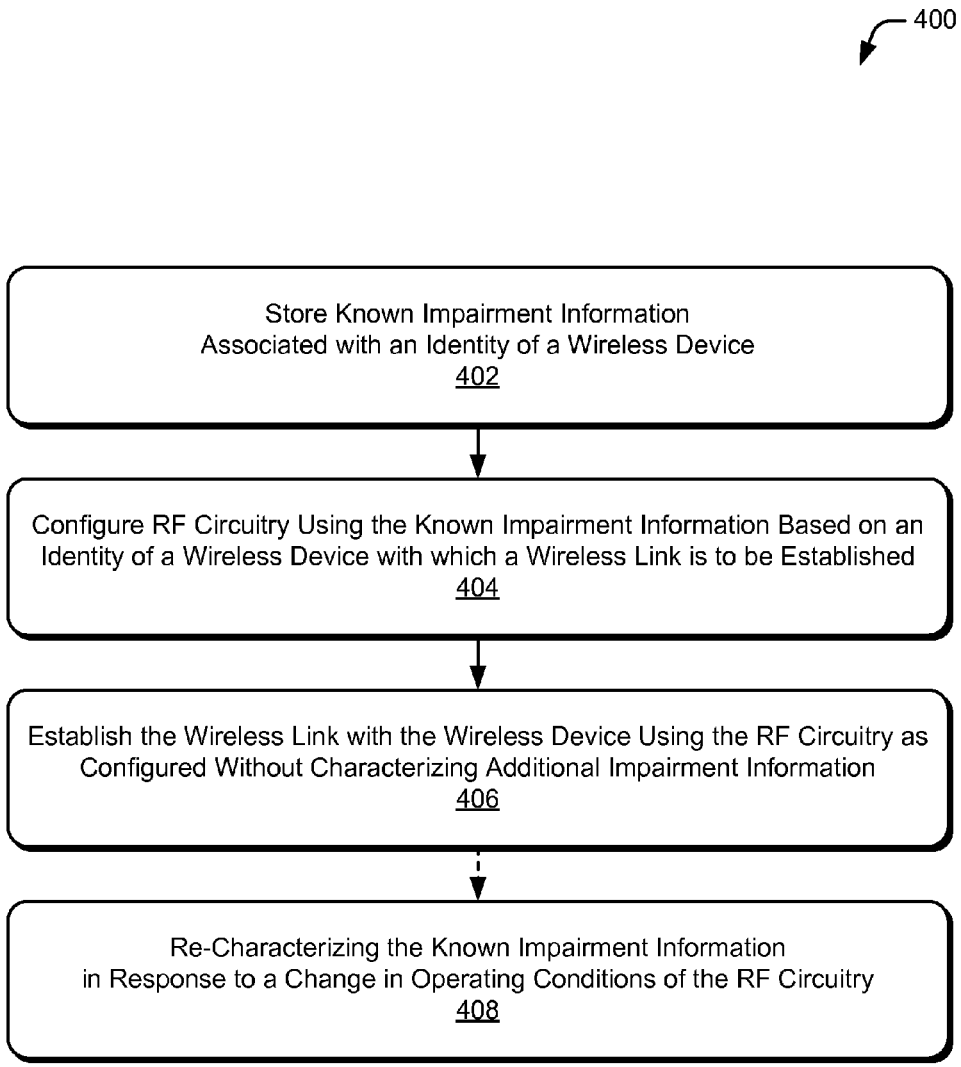
FIG. 4 illustrates a method of establishing a wireless link without characterizing impairment information.

FIG. 4 depicts a method 400 for establishing a wireless link without characterizing impairment information, including operations performed by impairment manager 124 of FIG. 1.

At 402, known impairment information associated with an identity of a wireless device is stored. The impairment information may include I/Q imbalance, phase noise, carrier frequency offset, DC voltage offset, or local oscillator leakage associated with the RF circuitry configured to communicate with the wireless device. The impairment information may be stored in any suitable memory structure, such as a table or index. A size of this memory structure may be sufficiently small (e.g., 10-30 kB), such that the memory structure may reside within non-volatile memory of a receiver or transceiver.

In some cases, the known impairment information may be received from another wireless device of a wireless network. For example, the known impairment information can be received from a peer device of a mesh network, an access point of a wireless network, or a cellular base station of a cellular network. In other cases, the known impairment information may have been estimated during a previous attempt to establish a wireless link with the wireless device.

As an example, consider remote control 114 in the context shown in FIG. 2, which shows remote control 114 communicating with other wireless devices 102 via wireless links 202-208. Assume here that impairment manager 124 of remote control 114 has received data packets from each of the other wireless devices 102. Here impairment manager 124 uses a physical layer of receiver 118 to determine respective impairment values for each wireless link 202-208. Impairment manager 124 then stores these impairment values in the corresponding locations of impairment index 210.

At 404, RF circuitry is configured using the known impairment information for a wireless link. The RF circuitry may be configured based on an identity of a wireless device with which the wireless link is to be established. The identity of the wireless device may be determined at a MAC or software layer of a receiver or transceiver. The identity of the wireless device may include a MAC address of a wireless interface, host name, IP address, serial number, asset control number, or other suitable property associated with the wireless device.

In the context of the present example, assume that a user of remote control 114 is attempting to download scheduling information for video content from the Internet via access point 110. Impairment manager 124 of remote control 114 receives a MAC address of access point 110 from the MAC layer of receiver 118. Impairment manager 124 then configures RF circuitry of transmitter 116 and/or receiver 118 using impairment values stored in impairment index 210 by referencing impairment values associated with the MAC address of access point 110.

At 406, a wireless link is established with the wireless device using the RF circuitry as configured without characterizing additional impairment information. This may be effective to save time and processing resources typically consumed by characterizing impairment information when establishing a wireless link. Establishing this wireless link may enable communication of data via a cellular network, wireless local-area-network, short-range wireless network, wireless peer-to-peer network, or wireless mesh network. Alternately or additionally, parameters of the wireless link may be configured based on the known impairment information. For example, a data rate, signal strength, modulation scheme, or routing path for data communicated via the wireless link may selected based on the known impairment information.

Continuing the ongoing example, remote control 114 establishes wireless link 206 with access point 110 using the RF circuitry as configured by impairment manager 124. Once wireless link 206 is established, remote control 114 can access the Internet via access point 110 to download the scheduling information for the video content. Remote control device 114 can then form other wireless links using impairment index 210 or continue to access network resources or other devices associated with access point 110 via wireless link 206.

Optionally at 408, the known impairment information can be re-characterized. This may be in response to changes in operating conditions of the RF circuitry. These changes may include a change in temperature, operating voltage, age, or other conditions associated with the RF circuitry. For example, the impairment information can be re-characterized in response to a 100 millivolt change in operating voltage of the RF circuitry. In some cases, the re-characterized impairment information can be transmitted to other entities of a wireless network enabling impairment information for the wireless network to be updated. Re-characterizing the impairment information may maintain or improve performance of a wireless communication system as environmental or other operating conditions change.

Concluding the present example, impairment manager 124 re-characterizes the impairment information associated with wireless link 206 in response to an operational voltage level of remote control 114 decreasing by 100 millivolts. By so doing, RF circuitry of remote control device can be compensated to account for the decrease in operating voltage thereby enabling performance of wireless link 206 to be maintained.

Figure 5:
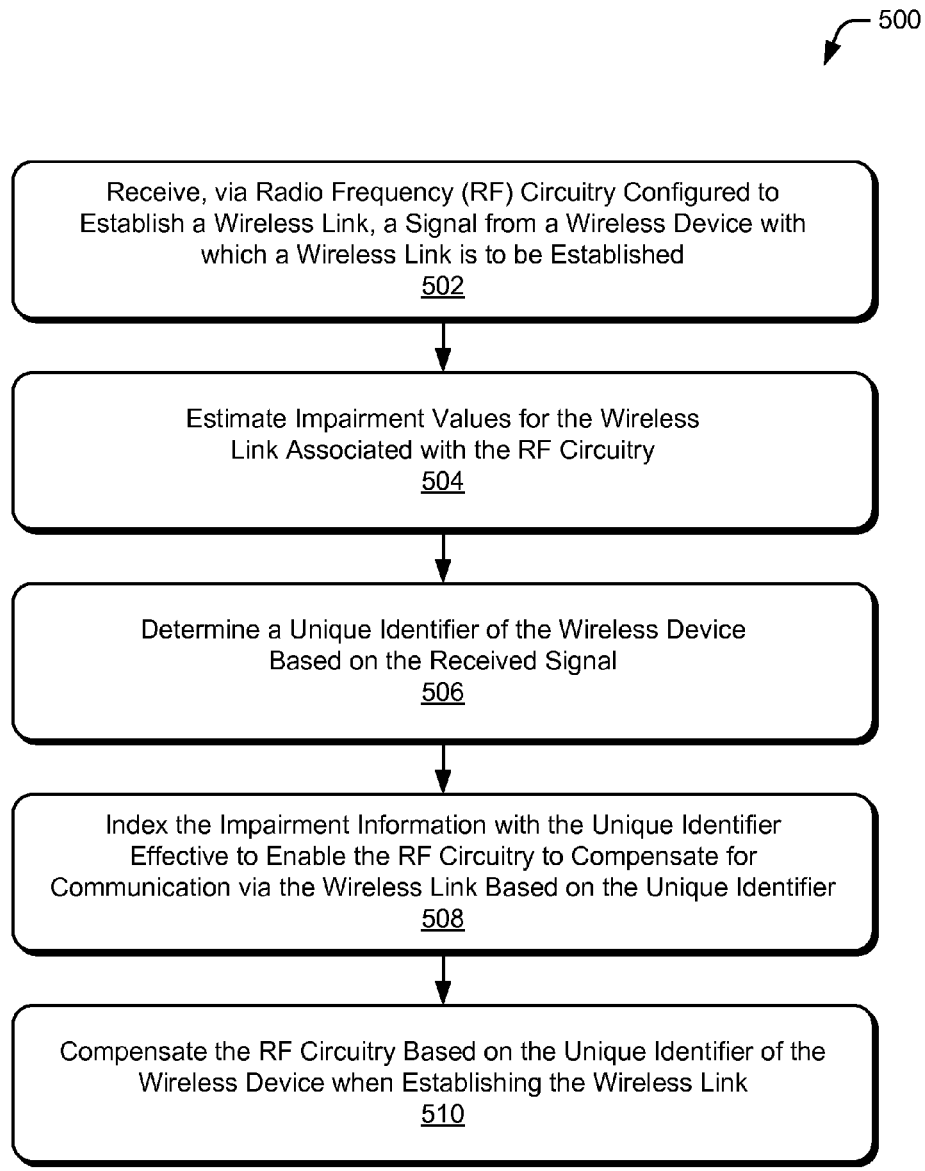
FIG. 5 illustrates a method of indexing impairment values with a unique identifier of a wireless device.

FIG. 5 depicts a method 500 for indexing impairment values with a unique identifier of a wireless device.

At 502, a signal from a wireless device with which a wireless link is to be established is received. This signal may be received via RF circuitry that is configured to establish the wireless link. In some cases, the signal carries information or data in compliance with a wireless networking communication protocol, such as IEEE 802.11, IEEE 802.15, or 3GPP LTE.

At 504, impairment values for the wireless link associated with the RF circuitry are estimated. These impairment values may be estimated based on data or packets of the received signal. Impairment values associated with the RF circuitry may include values for I/Q imbalance, phase noise, carrier frequency offset, Direct Current (DC) voltage offset, or local oscillator (LO) leakage of the RF circuitry.

At 506, a unique identifier of the wireless device is determined based on the received signal. The unique identifier may be determined at a MAC or software layer of a receiver. The unique identifier may include a MAC address of a wireless interface, host name, IP address, serial number, asset control number, or other suitable properties associated with the wireless device.

At 508, the impairment values are indexed with the unique identifier of the wireless device. This may be effective to enable the RF circuitry to compensate for communication via the wireless link based on the unique identifier of the wireless device. In some cases, several sets of impairment values may be associated with respective unique identifiers of multiple wireless devices (e.g., impairment index 210.)

Figure 6:
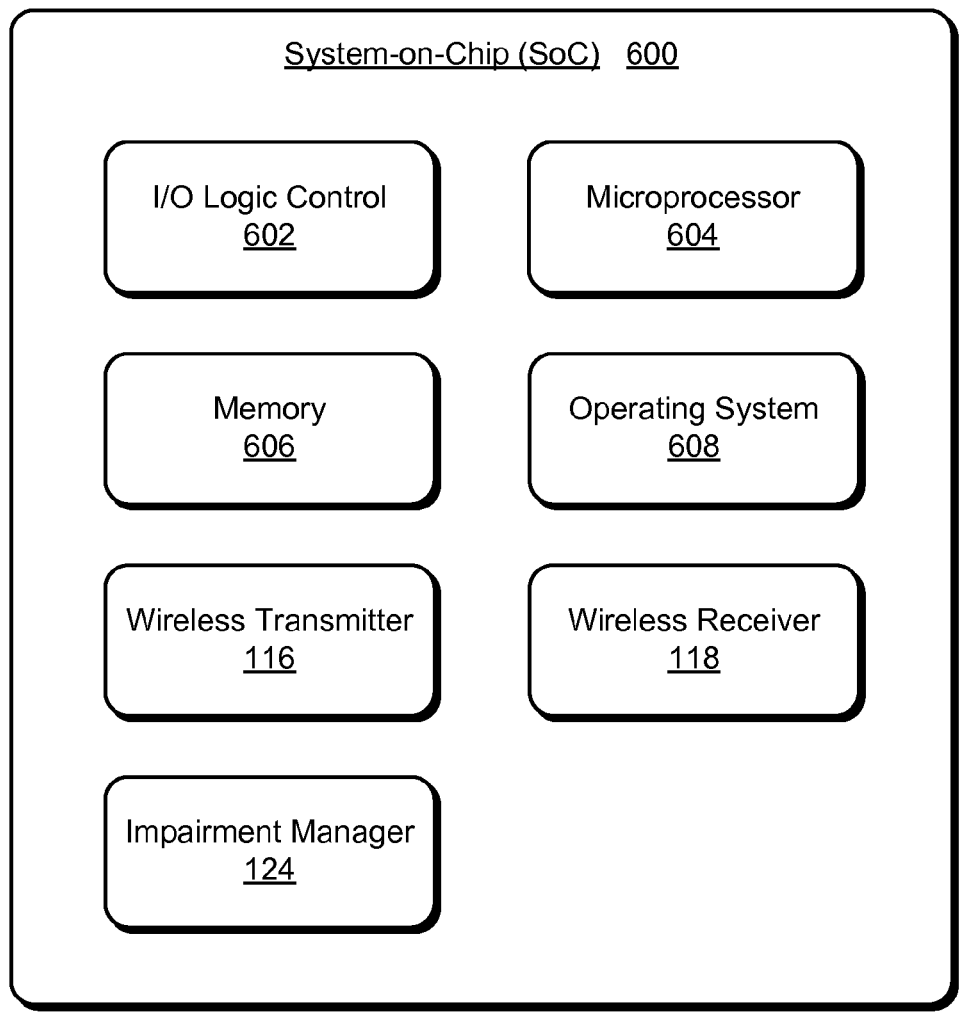
FIG. 6 illustrates a System-on-Chip (SoC) environment for implementing aspects of the techniques described herein.

At 510, the RF circuitry is compensated based on the unique identifier of the wireless device. Compensation of the RF circuitry may occur prior or during establishment of the wireless link. This may be effective to preclude the need to estimate additional impairment information during establishment of the wireless link. By so doing, time and processing power typically consumed by estimating additional impairment information can be conserved each time an attempt is made to establish a wireless link System-on-Chip FIG. 6 illustrates a System-on-Chip (SoC) 600, which can implement various embodiments described above. A SoC can be implemented in any suitable device, such as a video game console, IP enabled television, smart-phone, desktop computer, laptop computer, remote control, tablet computer, server, network-enabled printer, set-top box, printer, scanner, camera, picture frame, and/or any other type of device that may implement wireless connective technology.

SoC 600 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 600 can also include an integrated data bus (not shown) that couples the various components of the SoC for data communication between the components. A wireless communication device that includes SoC 600 can also be implemented with many combinations of differing components. In some cases, these differing components may be configured to implement concepts described herein over a wireless connection or interface.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, low-latency nonvolatile memory (e.g., Flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes wireless transmitter 116, wireless receiver 118, and impairment manager 124 (embodied as disparate or combined components as noted above). Examples of these various components, functions, and/or entities, and their corresponding functionality, are described with reference to the respective components of the environment 100 shown in FIG. 1 and FIG. 2.

Impairment manager 124, either independently or in combination with other entities, can be implemented as computer-executable instructions maintained by memory 606 and executed by microprocessor 604 to implement various embodiments and/or features described herein. Impairment manager 124 may also be provided integral with other entities of the SoC, such as integrated with one or both of I/O logic controller 602 or any packet-based interface within SoC 600. Alternatively or additionally, impairment manager 124 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method for establishing a unique wireless connection between wireless devices comprising:

receiving at a first wireless device, via complimentary metal-oxide semiconductor (CMOS) radio frequency circuitry having first operating conditions, data from a second wireless device over a wireless link, wherein the data includes an identifier that uniquely identifies the second wireless device;

estimating, based on the data received over the wireless link, first impairments of the CMOS circuitry having the first operating conditions;

associating the estimated first impairments of the CMOS circuitry with the identifier that uniquely identifies the second wireless device;

using the estimated first impairments associated with the identifier to compensate the CMOS circuitry having the first operating conditions;

re-characterizing the estimated first impairments in response to a change in the first operating conditions of the CMOS circuitry to second operating conditions of the CMOS circuitry to provide estimated second impairments;

storing the estimated first and second impairments as first and second impairment values associated with the identifier that uniquely identifies the second wireless device and with the first and second operating conditions, respectively; and in response to an attempt to establish a wireless connection between the first wireless device and the second wireless device under the first operating conditions, using the estimated first impairment values from storage to compensate the CMOS circuitry, the compensation effective to enable a unique wireless link between the first wireless device and the second wireless device; or in response to an attempt to establish a wireless connection between the first wireless device and the second wireless device under the second operating conditions, using the estimated second impairment values from storage to compensate the CMOS circuitry, the compensation effective to enable a unique wireless link between the first wireless device and the second wireless device.

2. The method of claim 1, wherein estimating the first impairments of the CMOS circuitry is performed at a physical layer of a wireless receiver.

3. The method of claim 1, further comprising:

in response to determining that compensating the CMOS circuitry exceeds a maximum compensation capability, requesting disconnection of the wireless connection between the first wireless device and the second wireless device.

4. The method of claim 1, wherein the first or second impairments of the CMOS circuitry include one or more of I/Q imbalance, phase noise, carrier frequency offset, Direct Current (DC) voltage offset, or local oscillator (LO) leakage.

5. The method of claim 1, wherein the identifier that uniquely identifies the second wireless device is determinable by a medium access control layer or a software layer of a wireless receiver.

6. The method of claim 1, wherein associating the estimated impairments of the CMOS circuitry with the identifier that uniquely identifies the second wireless device is performed at or above a medium access control layer of a wireless receiver.

7. The method of claim 1, further comprising transmitting, to a peer device of a wireless network or a device managing resources of the wireless network, the first and second estimated impairments of the CMOS circuitry and the identifier that uniquely identifies the second wireless device.

8. One or more computer-readable storage media devices comprising computer-executable instructions that, when executed, implement an impairment manager to:
   receive at a first wireless device, via complimentary metal-oxide semiconductor (CMOS) radio frequency circuitry having first operating conditions, data from a second wireless device over a wireless link, wherein the data includes an identifier that uniquely identifies the second wireless device;
   estimate, based on the data received over the wireless link, first impairments of the CMOS circuitry having the first operating conditions;
   associate the estimated first impairments of the CMOS circuitry with the identifier that uniquely identifies the second wireless device;
   use the estimated first impairments associated with the identifier to compensate the CMOS circuitry having the first operating conditions;
   re-characterize the estimated first impairments in response to a change in the first operating conditions of the CMOS circuitry to second operating conditions of the CMOS circuitry to provide estimated second impairments;
   store the estimated first and second impairments as first and second impairment values associated with the identifier that uniquely identifies the second wireless device and with the first and second operating conditions, respectively; and
   responsive to an attempt to establish a wireless connection between the first wireless device and the second wireless device under the first operating conditions, use the estimated first impairment values from storage to compensate the CMOS circuitry, the compensation effective to enable a unique wireless link between the first wireless device and the second wireless device; or
   responsive to an attempt to establish a wireless connection between the first wireless device and the second wireless device under the second operating conditions, use the estimated second impairment values from storage to compensate the CMOS circuitry, the compensation effective to enable a unique wireless link between the first wireless device and the second wireless device.

9. The one or more computer-readable storage media devices of claim 8, wherein estimation of the first impairments of the CMOS circuitry is performed at a physical layer of a wireless receiver.

10. The one or more computer-readable storage media devices of claim 8, wherein storage of the estimated first and second impairments as first and second impairment values further comprises instructing the impairment manager to:
    create a radio frequency impairment index table; and
    use the table to:
       index the first impairment values to the identifier that uniquely identifies the second wireless device and to the first operating conditions; and
       index the second impairment values to the identifier that uniquely identifies the second wireless device and to the second operating conditions.

11. The one or more computer-readable storage media devices of claim 10, wherein the impairment manager is further configured to:
    determine, based upon the data received over the wireless link having a data rate, a measure of quality of the wireless link; and
    adjust, based upon the measure of quality of the wireless link, the data rate of the wireless link, the adjustment effective to maximize the data rate with respect to the measured quality of the wireless link.

12. The one or more computer-readable storage media devices of claim 8, wherein the identifier that uniquely identifies the second wireless device is determinable by a medium access control layer or a software layer of a wireless receiver.

13. The one or more computer-readable storage media devices of claim 8, wherein association of the estimated impairments of the CMOS circuitry with the identifier that uniquely identifies the second wireless device is performed at or above a medium access control layer of a wireless receiver.

14. The one or more computer-readable storage media devices of claim 8, wherein the impairment manager is further configured to transmit, to a peer device of a wireless network or a device managing resources of the wireless network, the estimated first and second impairments of the CMOS circuitry and the identifier that uniquely identifies the second wireless device.

15. A system comprising:
    complimentary metal-oxide semiconductor (CMOS) radio frequency circuitry configured as a receiver for receiving data via a wireless network; and
    an impairment manager configured to:
    estimate, based on data received by the receiver, first impairments of the CMOS circuitry having first operating conditions, wherein the data received by the receiver includes an identifier that uniquely identifies another wireless device of the wireless network;
    associate the estimated first impairments of the CMOS circuitry with the identifier that uniquely identifies the other wireless device;
    use the estimated first impairments associated with the identifier to compensate the CMOS circuitry having the first operating conditions;
    re-characterize the estimated first impairments in response to a change in the first operating conditions of the CMOS circuitry to second operating conditions of the CMOS circuitry to provide estimated second impairments;
    store the estimated first and second impairments as first and second impairment values associated with the identifier that uniquely identifies the other wireless device and with the first and second operating conditions, respectively; and
    responsive to an attempt to establish a wireless connection between the receiver and the other wireless device under the first operating conditions, use the estimated first impairment values from storage to compensate the CMOS circuitry, the compensation effective to enable a unique wireless link between the first wireless device and the other wireless device; or
    responsive to an attempt to establish a wireless connection between the receiver and the other wireless device under the second operating conditions, use the estimated second impairment values from storage to compensate the CMOS circuitry, the compensation effective to enable a unique wireless link between the first wireless device and the other wireless device.

16. The system of claim 15, wherein estimation of the first impairments of the CMOS circuitry is performed at a physical layer of the receiver.

17. The system of claim 15, wherein:
- the wireless network is a mesh network including a plurality of devices, each device identified to the receiver via a unique identifier and having at least estimated first impairments;
- the impairment manager is further configured to determine, based at least in part upon the estimated first impairments of each device, a measure of quality of each unique wireless link between the devices; and
- network routing decisions in the mesh network are based at least in part upon the measure of quality of the wireless links between the devices.

18. The system of claim 15, wherein the first or second impairments of the CMOS circuitry include one or more of I/Q imbalance, phase noise, carrier frequency offset, Direct Current (DC) voltage offset, or local oscillator (LO) leakage.

19. The system of claim 15, wherein the identifier that uniquely identifies the other wireless device is determinable by a medium access control layer or a software layer of the receiver.

20. The system of claim 15, wherein the system is embodied as a System-on-Chip.

* * * * *